United States Patent
Kornegay et al.

(10) Patent No.: US 8,065,487 B2
(45) Date of Patent: *Nov. 22, 2011

(54) STRUCTURE FOR SHARED CACHE EVICTION

(75) Inventors: Marcus L. Kornegay, Durham, NC (US); Ngan N. Pham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 812 days.

This patent is subject to a terminal disclaimer.

(21) Appl. No.: 12/113,306

(22) Filed: May 1, 2008

(65) Prior Publication Data

US 2008/0235452 A1    Sep. 25, 2008

Related U.S. Application Data

(63) Continuation-in-part of application No. 11/689,265, filed on Mar. 21, 2007, now Pat. No. 7,840,759.

(51) Int. Cl.
*G06F 12/00* (2006.01)
(52) U.S. Cl. .................. 711/133; 711/E12.052
(58) Field of Classification Search .................. 711/130, 711/133, 135
See application file for complete search history.

(56) References Cited

U.S. PATENT DOCUMENTS

| | | | |
|---|---|---|---|
| 6,704,845 B2 | 3/2004 | Anderson et al. | |
| 6,950,909 B2 | 9/2005 | Guthrie et al. | |
| 6,965,970 B2 | 11/2005 | Mosur et al. | |
| 7,023,445 B1 | 4/2006 | Sell | |
| 7,120,752 B2 | 10/2006 | Wilson et al. | |
| 7,577,792 B2 | 8/2009 | Hady et al. | |
| 2003/0126369 A1 | 7/2003 | Creta et al. | |
| 2004/0168030 A1 | 8/2004 | Traversat et al. | |
| 2007/0005899 A1 | 1/2007 | Sistla et al. | |

OTHER PUBLICATIONS

U.S. Appl. No. 11/689,265, filed Mar. 21, 2007, entitled, "Shared Cache Eviction,".

Kim Hazelwood et al., "Exploring Code Cache Eviction Granularities in Dynamic Optimization Systems," Proceedings of the International Symposium on Code Generation and Optimization, 2004, IEEE Computer Society.

*Primary Examiner* — Reginald Bragdon
*Assistant Examiner* — Hamdy Ahmed
(74) *Attorney, Agent, or Firm* — Patterson & Sheridan, LLP

(57) ABSTRACT

A design structure embodied in a machine readable storage medium for of designing, manufacturing, and/or testing for shared cache eviction in a multi-core processing environment having a cache shared by a plurality of processor cores is provided. The design structure includes means for receiving from a processor core a request to load a cache line in the shared cache; means for determining whether the shared cache is full; means for determining whether a cache line is stored in the shared cache that has been accessed by fewer than all the processor cores sharing the cache if the shared cache is full; and means for evicting a cache line that has been accessed by fewer than all the processor cores sharing the cache if a cache line is stored in the shared cache that has been accessed by fewer than all the processor cores sharing the cache.

16 Claims, 4 Drawing Sheets

Cache Reference Directory 'CRD' 118

Cache Line ID ~ 202
Address ~ 204
CPU Core 0 ~ 206
CPU Core 1 ~ 208
CPU Core 2 ~ 210

*Fig. 2*

STRUCTURE FOR SHARED CACHE EVICTION

CROSS-REFERENCE TO RELATED APPLICATION

This application is a continuation-in-part of co-pending U.S. patent application Ser. No. 11/689,265, filed Mar. 21, 2007 now U.S. Pat. No. 7,840,759, which is herein incorporated by reference.

BACKGROUND OF THE INVENTION

1. Field of the Invention

The field of the invention is generally related to design structures, and more specifically, design structures for products for shared cache eviction.

2. Description of Related Art

Multi-core computer architecture typically includes multiple processor cores on a single chip, referred to as a chip multiprocessor (CMP). The chip also typically includes cache memory shared by the multiple processors cores referred to as a shared cache. When the shared cache becomes full one or more cache lines in the shared cache is typically evicted. Conventional eviction schemes simply evict the least frequently used cache line or the least recently used cache line without regard to which processor cores or how many processor cores accessed the cache line. There is therefore an ongoing need for improvement in the field of shared cache eviction in multi-core processor computer architecture.

SUMMARY OF THE INVENTION

Methods and systems for shared cache eviction in a multi-core processing environment having a cache shared by a plurality of processor cores are provided. Embodiments include receiving from a processor core a request to load a cache line in the shared cache; determining whether the shared cache is full; determining whether a cache line is stored in the shared cache that has been accessed by fewer than all the processor cores sharing the cache if the shared cache is full; and evicting a cache line that has been accessed by fewer than all the processor cores sharing the cache if a cache line is stored in the shared cache that has been accessed by fewer than all the processor cores sharing the cache.

In another embodiment, a design structure embodied in a machine readable storage medium for at least one of designing, manufacturing, and testing a design is provided. The design structure generally includes system for shared cache eviction. The system generally includes a multi-core processing environment having a cache shared by a plurality of processor cores. The system further includes means for receiving from a processor core a request to load a cache line in the shared cache, means for determining whether the shared cache is full, means for determining whether a cache line is stored in the shared cache that has been accessed by fewer than all the processor cores sharing the cache if the shared cache is full, and means for evicting a cache line that has been accessed by fewer than all the processor cores sharing the cache if a cache line is stored in the shared cache that has been accessed by fewer than all the processor cores sharing the cache.

In another embodiment, a design structure embodied in a machine readable storage medium for at least one of designing, manufacturing, and testing a design is provided. The design structure includes a multi-core processing system having a cache shared by a plurality of processor cores. The system further includes control logic coupled to the plurality of processor cores and the shared cache, and a cache reference tracker coupled to the control logic capable of determining whether a cache line is stored in the shared cache that has been accessed by fewer than all the processor cores sharing the cache if the shared cache is full.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 sets forth a block diagram of a data structure useful as a cache reference directory.

DETAILED DESCRIPTION OF PREFERRED EMBODIMENTS

Figure 1:
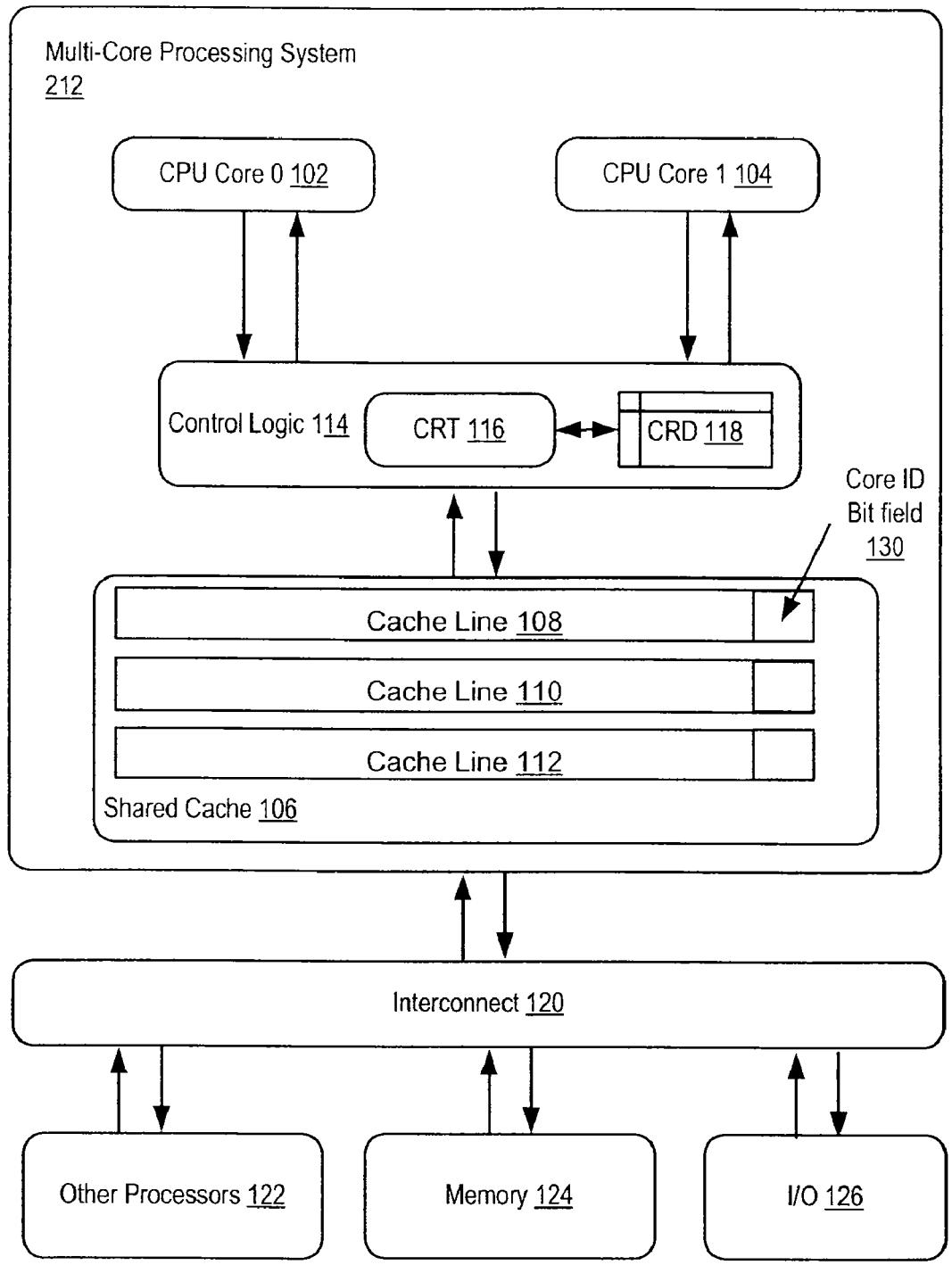
FIG. 1 sets forth a block diagram illustrating an exemplary system for shared cache eviction according to embodiments of the present invention.

Exemplary methods and systems products for shared cache eviction according to embodiments of the present invention are described with reference to the accompanying drawings, beginning with FIG. 1. FIG. 1 sets forth a block diagram illustrating an exemplary system for shared cache eviction according to embodiments of the present invention. The system of FIG. 1 operates generally to evict cache lines in a shared cache in a multi-core processing environment having a cache shared by a plurality of processor cores. The system of FIG. 1 operates for shared cache eviction by receiving from a processor core (102 or 104) a request to load a cache line in the shared cache (106); determining whether the shared cache (106) is full; determining whether a cache line (108, 110, or 112) is stored in the shared cache (106) that has been accessed by fewer than all the processor cores (102 and 104) sharing the cache (106) if the shared cache is full; and evicting a cache line (102) that has been accessed by fewer than all the processor cores (102 and 104) sharing the cache if a cache line (108, 110, or 112) is stored in the shared cache (106) that has been accessed by fewer than all the processor cores (102 and 104) sharing the cache.

Shared cache eviction according to embodiments of the present invention often includes evicting a cache line accessed by the fewest number of processor cores. That is, for example, in a two processor system, shared cache eviction supports evicting a cache line accessed by only one processor and in a three processor system, shared cache eviction supports prioritizing evicting a cache line accessed by only one processor rather than a cache line accessed by two processors and so on. Evicting a cache line accessed by the fewest number of processors maintains cache lines in the shared cache that have been accessed by more processor cores.

The exemplary system of FIG. 1 includes a multi-core processing system (212) having a cache (106) shared by a plurality of processor cores (102 and 104). The system of FIG. 1 includes control logic (114) coupled to the plurality of processor cores (102 and 104) and the shared cache (106). The control logic is capable of receiving requests to load cache lines (108, 110, and 112) into the shared cache (106) and providing access to the stored cache lines (108, 110 and 112) to the processor cores (102 and 104). The control logic (114) is also capable of evicting cache lines (108, 110, and 112) from the shared cache (106) if the shared cache is full.

The control logic (116) of FIG. 1 includes a cache reference tracker ('CRT') (116) capable of writing, to a core ID field in a cache reference directory ('CRD') in response to a processor core accessing a cache line in the shared cache, a core ID for the core processor accessing the cache line. The CRD (118) is implemented as a data structure useful in tracking cache lines that have been accessed by fewer than all the processor cores. Such a data structure allows a CRT (116) to quickly identify one or more cache lines accessed by the fewest processor cores and evict those cache lines thereby preserving in the cache lines that have been accessed by more processor cores.

The CRT (116) of FIG. 1 is also capable of writing, to a core ID bit field (130) in a cache line (108, 110, and 112) in response to a processor core accessing a cache line in the shared cache, a core ID for the core processor accessing the cache line. In such cases, the CRT can then determine which processor cores have accessed the cache line from the bit field (130) in the cache line itself.

The cache reference tracker (116) is also capable of determining whether a cache line is stored in the shared cache that has been accessed by fewer than all the processor cores sharing the cache if the shared cache is full. The cache reference tracker (116) is capable of determining whether a cache line is stored in the shared cache that has been accessed by fewer than all the processor cores sharing the cache by either scanning a cache reference directory ('CRD') (118) to identify one or more cache lines accessed by fewer than all the processor cores or by scanning a core ID bit field (130) in each of the cache lines (108, 110, and 112) stored in the shared cache (106).

The multi-core processing system (212) is coupled through an interconnect (120) to other processors (112), memory (124), and input/output devices (126). The arrangement of systems and components making up the exemplary system illustrated in FIG. 1 are for explanation, not for limitation. Data processing systems useful according to various embodiments of the present invention may include additional components, devices, servers, routers, other devices, and peer-to-peer architectures, not shown in FIG. 1, as will occur to those of skill in the art. Various embodiments of the present invention may be implemented on a variety of hardware platforms in addition to those illustrated in FIG. 1.

In the example of FIG. 1 there are shown only two processor cores (102 and 104) and three cache lines (108, 110, and 112) in the shared cache. This is for explanation and not for limitation. In fact, multi-core processing systems support many processing cores and many, many more cache lines in the shared cache and all such multi-core processing systems are well within the scope of the present invention.

As mentioned above, a cache reference tracker according to some embodiments of the present invention is capable of determining whether a cache line is stored in the shared cache that has been accessed by fewer than all the processor cores sharing the cache by scanning a cache reference directory ('CRD') (118) to identify one or more cache lines accessed by fewer than all the processor cores. The CRD (118) is typically implemented as a data structure useful in tracking cache lines that have been accessed by fewer that all the processor cores. For further explanation, therefore FIG. 2 sets forth a block diagram of a data structure useful as a CRD (118). The CRD (118) of FIG. 2 includes a cache line ID field (202) containing a unique identification of a cache line stored in the shared cache. The CRD (118) of FIG. 2 includes an address field (204) containing the address in the shared cache where the cache line identified in field (202) resides.

The CRD also include Boolean fields (206, 208, and 210) for each processor core having access to the shared cache. Each Boolean field contains a Boolean indicator identifying whether that particular processor core accessed the cache line identified in field (202). The CRD of FIG. 2 advantageously allows a CRT (116) to quickly identify one or more cache lines accessed by the fewest processor cores. Evicting those cache lines thereby preserves the cache lines that have been accessed by more processor cores.

Figure 3:
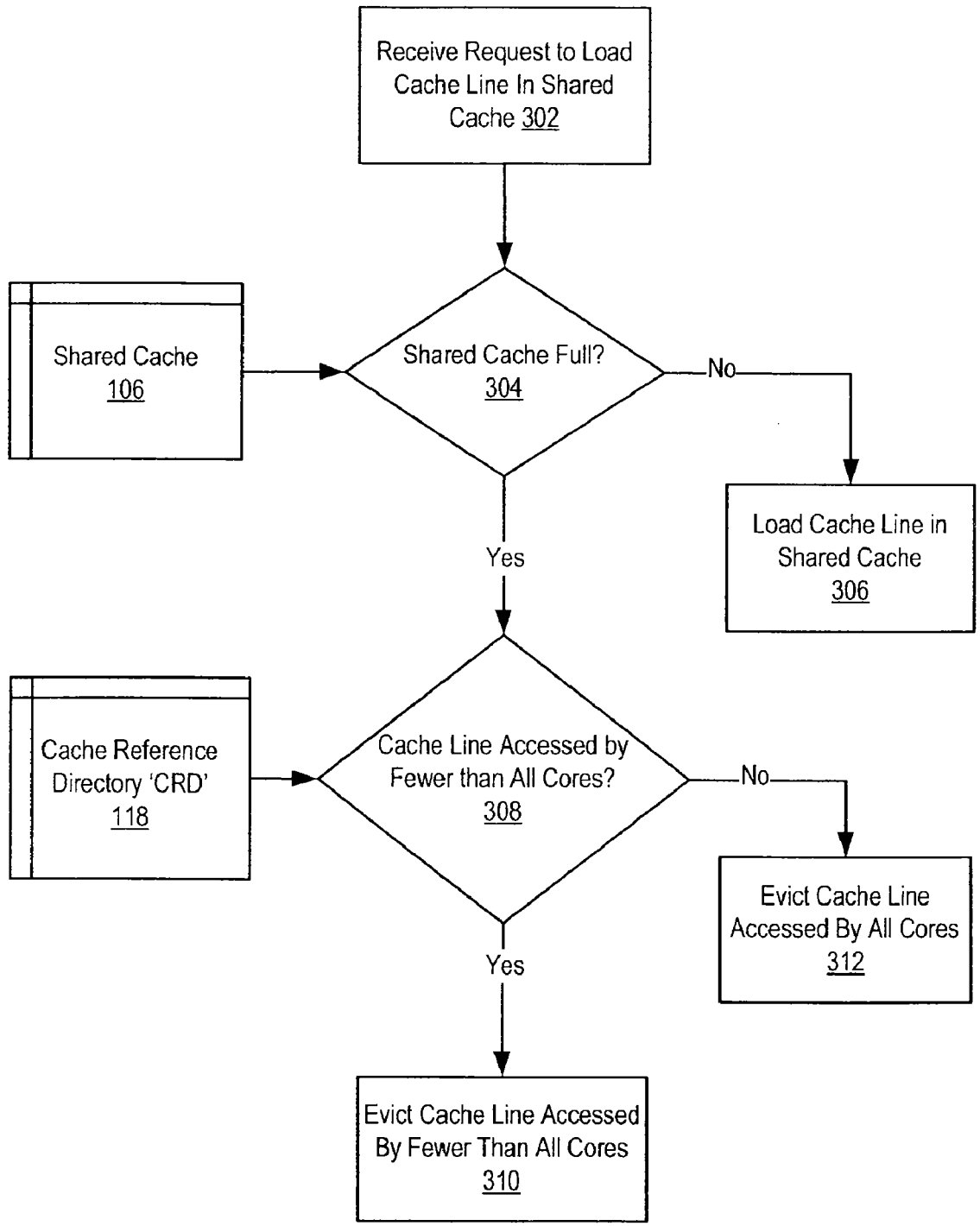
FIG. 3 sets forth a flow chart illustrating an exemplary method for shared cache eviction according to embodiments of the present invention.

For further explanation, FIG. 3 sets forth a flow chart illustrating an exemplary method for shared cache eviction according to embodiments of the present invention. The method of FIG. 3 is implemented in a multi-core processing environment having a cache shared by a plurality of processor cores. The method of FIG. 3 includes receiving (302) from a processor core a request to load a cache line in the shared cache (106) and determining (304) whether the shared cache (106) is full. If the shared cache is not full the method of FIG. 3 includes loading the cache line in the shared cache (306).

If the shared cache is full, the method of FIG. 3 includes determining (308) whether a cache line is stored in the shared cache (106) that has been accessed by fewer than all the processor cores sharing the cache. Determining (3080 whether a cache line is stored in the shared cache (106) that has been accessed by fewer than all the processor cores may be carried out by searching in a cache reference directory ('CRD') (118) for cache lines identified as having been accessed by fewer than all the processor cores. In such embodiments, each time a cache line in the shared cache is accessed a core ID for the core processor accessing the cache line is written to a core ID field in the cache reference directory. The CRD allows for quick identification of one or more cache lines accessed by the fewest processor cores. Evicting those cache lines thereby preserves the cache lines that have been accessed by more processor cores.

Alternatively, determining (308) whether a cache line is stored in the shared cache that has been accessed by fewer than all the processor cores sharing the cache may be carried out by reading a core ID bit field from a cache line (not shown) in the shared cache and determining in dependence upon the contents of the core ID bit field whether the cache line was accessed by fewer than all the processor cores sharing the cache. In such embodiments, each time a cache line in the shared cache is accessed a core ID for the core processor accessing the cache line is written to a core ID bit field in a cache line itself. In such cases, the determination of whether a cache line was accessed by fewer than all the core processors may be made from the cache lines themselves.

If a cache line is stored in the shared cache that has been accessed by fewer than all the processor cores sharing the cache, the method of FIG. 3 includes evicting (416) a cache line that has been accessed by fewer than all the processor cores sharing the cache. Evicting (416) a cache line that has been accessed by fewer than all the processor cores sharing the cache may often include evicting a cache line accessed by the fewest number of processor cores. Evicting those cache lines that have been accessed by the fewest number of processor cores thereby preserves the cache lines that have been accessed by more processor cores.

Evicting (416) a cache line that has been accessed by fewer than all the processor cores sharing the cache may be carried out by selecting a least recently used cache line that that has been accessed by fewer than all the processor cores and evicting the selected cache line. Evicting a cache line that has been accessed by fewer than all the processor cores sharing the cache if a cache line is stored in the shared cache that has been accessed by fewer than all the processor cores sharing the cache may also include selecting a least frequency used cache line that that has been accessed by fewer than all the processor cores and evicting the selected cache line.

If a cache line is stored in the shared cache that has been accessed by fewer than all the processor cores sharing the cache then the method of FIG. 3 includes evicting (312) a cache line accessed by all of the cores. Evicting a cache line accessed by all of the cores may include evicting a least recently used cache line accessed by the processor cores, evicting a least frequently used cache line that has been accessed by all the processor cores, or others as will occur to those of skill in the art.

Figure 4:
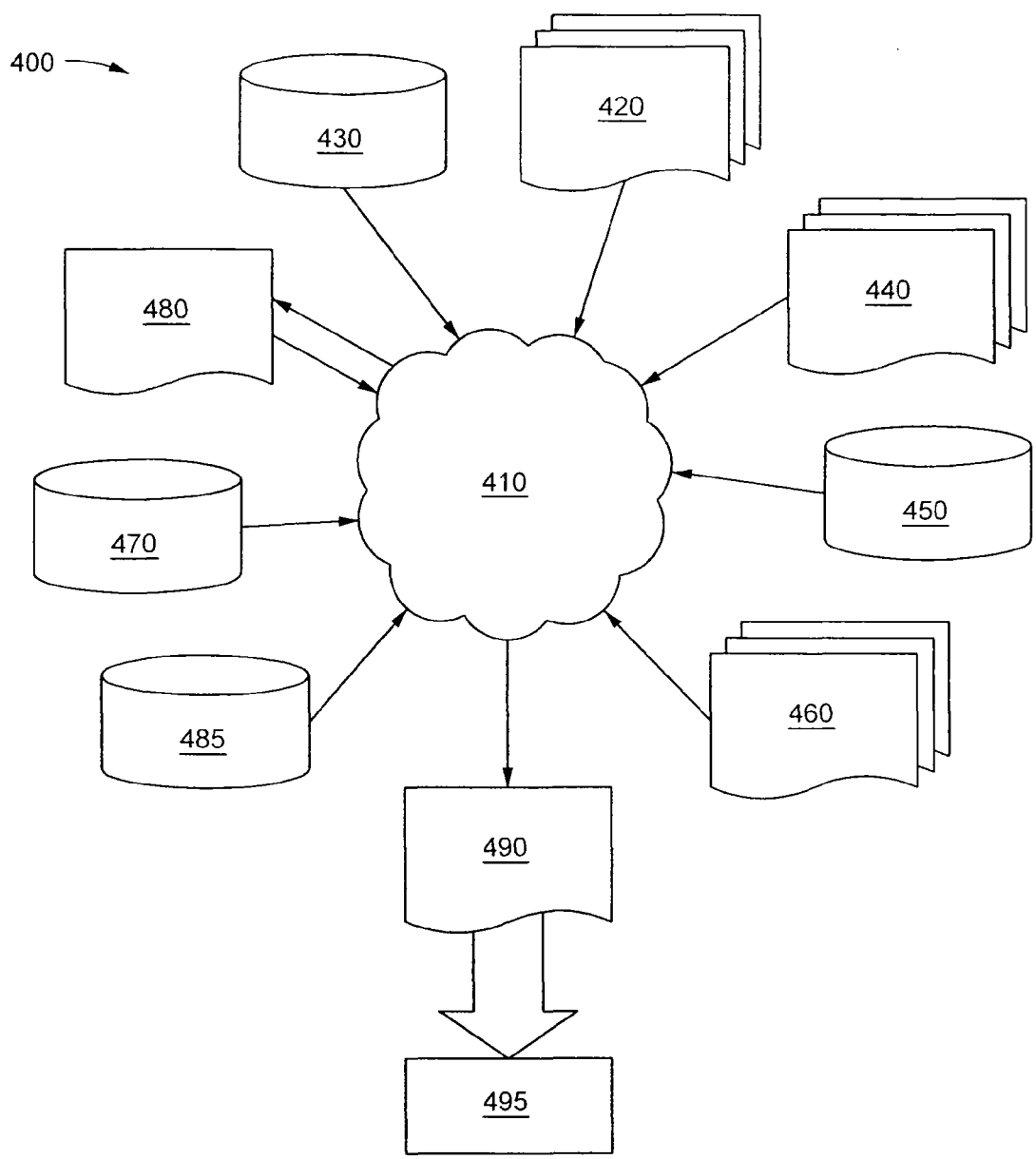
FIG. 4 is a flow diagram of a design process used in semiconductor design, manufacture, and/or test.

FIG. 4 shows a block diagram of an exemplary design flow (400) used for example, in semiconductor design, manufacturing, and/or test. Design flow (400) may vary depending on the type of IC being designed. For example, a design flow (400) for building an application specific IC (ASIC) may differ from a design flow (400) for designing a standard component. Design structure (420) is preferably an input to a design process (410) and may come from an IP provider, a core developer, or other design company or may be generated by the operator of the design flow, or from other sources. Design structure (420) comprises the circuits described above and shown in FIGS. 1 and 2 in the form of schematics or HDL, a hardware-description language (e.g., Verilog, VHDL, C, etc.). Design structure (420) may be contained on one or more machine readable medium. For example, design structure (420) may be a text file or a graphical representation of a circuit as described above and shown in FIGS. 1 and 2. Design process (410) preferably synthesizes (or translates) the circuit described above and shown in FIGS. 1 and 2 into a netlist (480), where netlist (480) is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist (480) is resynthesized one or more times depending on design specifications and parameters for the circuit.

Design process (410) may include using a variety of inputs; for example, inputs from library elements (430) which may house a set of commonly used elements, circuits, and devices, including models, layouts, and symbolic representations, for a given manufacturing technology (e.g., different technology nodes, 32 nm, 45 nm, 90 nm, etc.), design specifications (440), characterization data (450), verification data (460), design rules (470), and test data files (485) (which may include test patterns and other testing information). Design process (410) may further include, for example, standard circuit design processes such as timing analysis, verification, design rule checking, place and route operations, etc. One of ordinary skill in the art of integrated circuit design can appreciate the extent of possible electronic design automation tools and applications used in design process (410) without deviating from the scope and spirit of the invention. The design structure of the invention is not limited to any specific design flow.

Design process (410) preferably translates a circuit as described above and shown in FIGS. 1 and 2, along with any additional integrated circuit design or data (if applicable), into a second design structure (490). Design structure 490 resides on a storage medium in a data format used for the exchange of layout data of integrated circuits (e.g. information stored in a GDSII (GDS2), GL1, OASIS, or any other suitable format for storing such design structures). Design structure (490) may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1 and 2. Design structure (490) may then proceed to a stage (495) where, for example, design structure (490): proceeds to tape-out, is released to manufacturing, is released to a mask house, is sent to another design house, is sent back to the customer, etc.

Exemplary embodiments of the present invention are described largely in the context of a fully functional computer system for shared cache eviction. Readers of skill in the art will recognize, however, that aspects of the present invention also may be embodied in a computer program disposed on signal bearing media. Such signal bearing media may be transmission media or recordable media for machine-readable information, including magnetic media, optical media, or other suitable media. It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A design structure embodied in a machine readable storage medium for at least one of designing, manufacturing, and testing a design, the design structure comprising:
    a system for shared cache eviction, the system including a multi-core processing environment having a cache shared by a plurality of processor cores, the system comprising:
        means for receiving from a processor core a request to load a cache line in the shared cache;
        means for determining whether the shared cache is full;
        means for determining whether a cache line is stored in the shared cache that has been accessed by fewer than all the processor cores sharing the cache if the shared cache is full; and
        means for evicting a cache line that has been accessed by fewer than all the processor cores sharing the cache if a cache line is stored in the shared cache that has been accessed by fewer than all the processor cores sharing the cache.

2. The design structure of claim 1, wherein the means for evicting a cache line that has been accessed by fewer than all the processor cores sharing the cache further comprises means for evicting a cache line accessed by the fewest number of processor cores.

3. The design structure of claim 1, wherein the means for evicting a cache line that has been accessed by fewer than all the processor cores sharing the cache further comprises:
    means for selecting a least recently used cache line that that has been accessed by fewer than all the processor cores; and
    means for evicting the selected cache line.

4. The design structure of claim 1, wherein the means for evicting a cache line that has been accessed by fewer than all the processor cores sharing the cache further comprises:

means for selecting a least frequency used cache line that that has been accessed by fewer than all the processor cores; and means for evicting the selected cache line.

5. The design structure of claim 1, wherein the means for determining whether a cache line is stored in the shared cache that has been accessed by fewer than all the processor cores sharing the cache further comprises:

means for searching in a cache reference directory for cache lines identified as having been accessed by fewer than all the processor cores.

6. The design structure of claim 1, further comprising:

means for writing, to a core ID field in the cache reference directory in response to a processor core accessing a cache line in the shared cache, a core ID for the core processor accessing the cache line.

7. The design structure of claim 1, further comprising:

means for writing, to a core ID bit field in a cache line in response to a processor core accessing a cache line in the shared cache, a core ID for the core processor accessing the cache line.

8. The design structure of claim 7, wherein the means for determining whether a cache line is stored in the shared cache that has been accessed by fewer than all the processor cores sharing the cache further comprises:

means for reading a core ID bit field from a cache line in the shared cache and means for determining in dependence upon the contents of the core ID bit field whether the cache line was accessed by fewer than all the processor cores sharing the cache.

9. The design structure of claim 1, wherein the design structure comprises a netlist which describes the system.

10. The design structure of claim 1, wherein the design structure resides on the machine readable storage medium as a data format used for the exchange of layout data of integrated circuits.

11. A design structure embodied in a machine readable storage medium for at least one of designing, manufacturing, and testing a design, the design structure comprising:

a multi-core processing system having a cache shared by a plurality of processor cores, the system comprising:

control logic coupled to the plurality of processor cores and the shared cache; and a cache reference tracker coupled to the control logic capable of determining whether a cache line is stored in the shared cache that has been accessed by fewer than all the processor cores sharing the cache if the shared cache is full.

12. The design structure of claim 11, wherein the cache reference tracker is capable of writing, to a core ID field in a cache reference directory in response to a processor core accessing a cache line in the shared cache, a core ID for the core processor accessing the cache line.

13. The design structure of claim 11, wherein the cache reference tracker is capable of writing, to a core ID bit field in a cache line in response to a processor core accessing a cache line in the shared cache, a core ID for the core processor accessing the cache line.

14. The design structure of claim 11, wherein the control logic is further capable of evicting a cache line that has been accessed by fewer than all the processor cores sharing the cache.

15. The design structure of claim 11, wherein the design structure comprises a netlist which describes the multi-core processing system.

16. The design structure of claim 11 wherein the design structure resides on the machine readable storage medium as a data format used for the exchange of layout data of integrated circuits.

* * * * *